No. 831,588. PATENTED SEPT. 25, 1906.
T. C. WOOD.
PIPE COUPLING.
APPLICATION FILED SEPT. 15, 1905.

WITNESSES: INVENTOR,
F. E. Gaither Thomas C. Wood
Archworth Martin by atty
Paul Synnestvedt

UNITED STATES PATENT OFFICE.

THOMAS C. WOOD, OF BRIDGEPORT, CONNECTICUT, ASSIGNOR TO CRANE COMPANY, OF CHICAGO, ILLINOIS, A CORPORATION OF ILLINOIS.

PIPE-COUPLING.

No. 831,588.      Specification of Letters Patent.      Patented Sept. 25, 1906.

Application filed September 15, 1905. Serial No. 278,618.

*To all whom it may concern:*

Be it known that I, THOMAS C. WOOD, a citizen of the United States, residing at Bridgeport, in the State of Connecticut, have invented certain new and useful Improvements in Pipe-Couplings, of which the following is a specification.

My invention relates to improvements in couplings for uniting pipes of different diameters, commonly known as "reducing couplings" and its principal object is to provide an improved form of the device which does not necessitate the use of flanges of special design for the different sizes of pipes to be united.

Figure 1:
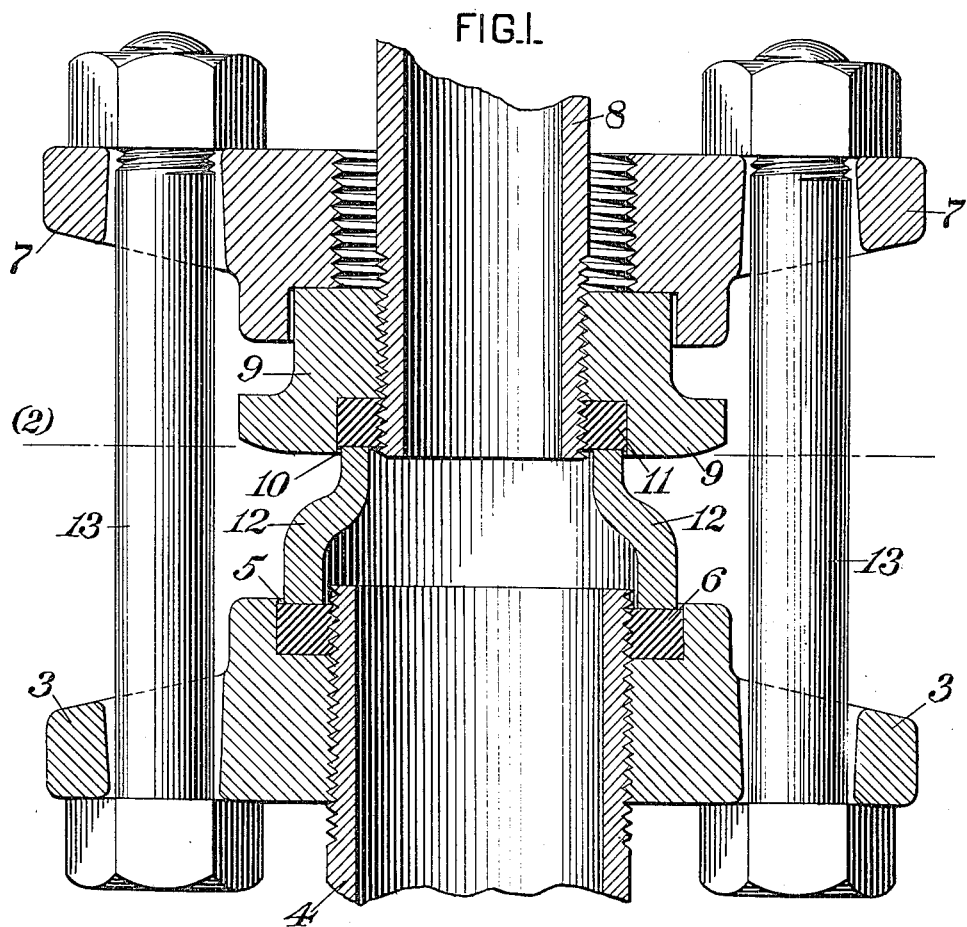
Figure 2:
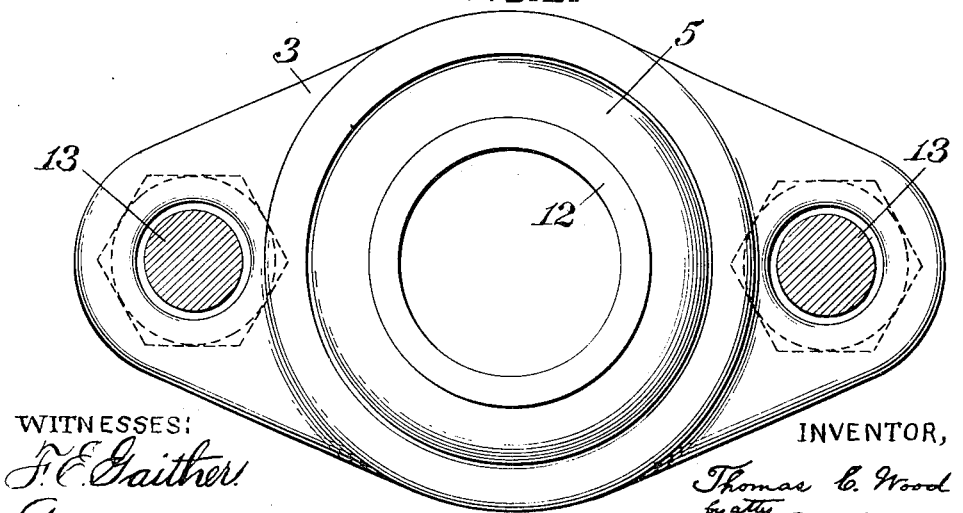

A further object of my invention is to provide a pipe coupling of the class described, especially adapted to retain gases under high pressure or where subjected to extreme variations of temperature. These objects, and other advantages to hereinafter appear, I attain by means of the construction illustrated in preferred form in the accompanying drawing, wherein Figure 1 is a longitudinal section of a pipe coupling and its component parts, illustrating my improvements applied thereto, and Figure 2 is a sectional plan view on the line (2) of Figure 1.

In a pipe coupling of this class as heretofore constructed it has been found necessary to provide a special flange for the smaller pipe, having bolt holes on the same centers as those in the larger pipe flange. In order to overcome this objectionable feature and at the same time provide a coupling which will remain tight under high pressure or when subjected to extreme variations of temperature, a flange 3, is screw-threaded or secured in any other suitable manner to the end of the larger pipe 4, and is provided upon its inner face with an annular depression, through which the end of the pipe projects, the sides of said depression and pipe thus forming an annular groove or recess 5 for the reception of a packing 6.

A flange 7 corresponding in size and construction with the flange 3, surrounds the smaller pipe 8, upon which is screw-threaded or secured in any other suitable manner a bushing 9, the outer end of which is formed to fit into the annular depression in the inner face of the flange. The inner face of the bushing 9 is also provided with an annular depression through which the end of the pipe 8 projects, the sides of said depression and pipe thus forming an annular groove or recess 10 for the reception of a packing 11, similar to that in the groove 5. The flanges 3 and 7 are drawn together by means of longitudinal bolts 13.

The packings 6 and 11 are forced into the grooves 5 and 10 in such manner as to form an absolutely tight joint around the pipes 4 and 8 respectively, when the flanges are locked together by means of an interposed sleeve or nipple 12, the ends of which correspond in size with the annular grooves into which they fit and abut against the packings.

From the foregoing description it will be observed that in a coupling constructed in accordance with my invention it is not necessary to use a flange of special size or design when uniting pipes of different diameters, as pipes of any size may be coupled together by the simple expedient of tapping the bushing to fit the smaller pipe and inserting a sleeve or nipple whose two ends are of a slightly greater diameter than that of the pipes to be connected. The recess in the flange 7 is not necessary, but it is convenient for accurately centering the bushings thereon.

Having thus described my invention and illustrated its use, what I claim as new, and desire to secure by Letters Patent, is the following:

1. In a pipe coupling the combination with a large pipe and flange head thereon and another like flange head, each of same having a recess in its face, of a similarly recessed smaller flange head fixed on a smaller pipe and seated in the recess of one of said large heads, a coupling sleeve having a small and a large end, seated respectively in the recesses of the small and large flange heads, and means to compress said parts together.

2. The combination with a large and a small pipe each having a flange head fixed thereon, of a sleeve having a large and a small end respectively abutting said flange heads and another similar large flange head having a recess engaging the smaller flange head behind, and means to clamp the parts together, substantially as described.

3. The combination with two like recessed large flanged heads and a pipe secured in one of them, of a small pipe having a similar recessed flange head screwed thereon, the said head resting in the recess of the free large head, and a plain coupling sleeve having two ends of different diameter resting respectively in the recesses of the large and small flange heads, means to pack said ends, and bolts to draw the large heads together and clamp the coupling sleeve between.

4. A pipe coupling for connecting pipes of different diameters comprising, in combination, two flanges of a construction to fit the larger pipe, one of the same being secured to said large pipe and the other surrounding the small pipe, a bushing 9 secured to said small pipe where it projects through the adjacent large flange, and a nipple interposed between said bushing and the opposite large flange with means for holding said parts together, substantially as described.

In testimony whereof I have hereunto signed my name in the presence of the two subscribed witnesses.

T. C. WOOD.

Witnesses:
F. J. ALLEN,
C. G. HARRIS.